US006688506B2

(12) United States Patent  (10) Patent No.: US 6,688,506 B2
Schwartz  (45) Date of Patent: Feb. 10, 2004

(54) DEVICE FOR HOLDING A BRIEF CASE ON A VEHICLE SEAT

(76) Inventor: Ronald L. Schwartz, 17708 Wendy Sue Ave., Hudson, FL (US) 34667

( * ) Notice: Subject to any disclaimer, the term of this patent is extended or adjusted under 35 U.S.C. 154(b) by 78 days.

(21) Appl. No.: 10/141,660

(22) Filed: May 7, 2002

(65) Prior Publication Data

US 2003/0209580 A1 Nov. 13, 2003

(51) Int. Cl.$^7$ ................................................. B60R 7/00
(52) U.S. Cl. .................................. 224/275; 248/229.13
(58) Field of Search ........................... 224/275, 277; 211/200, 201, 46, 85; 248/150, 229.12, 229.13, 277.1, 99, 100, 311.2; 221/46; 297/188.01, 188.02; 220/9.3

(56) References Cited

U.S. PATENT DOCUMENTS

| | | | |
|---|---|---|---|
| 2,524,909 A | 10/1950 | Hines | |
| 2,692,638 A | 10/1954 | Castell | |
| 2,784,889 A | * 3/1957 | Kennedy | 224/275 |
| 3,118,704 A | 1/1964 | Meserve | |
| 3,164,408 A | 1/1965 | Bassett | |
| 3,338,629 A | 8/1967 | Drees | |
| 3,630,343 A | * 12/1971 | Wohl | 224/277 |
| 3,876,247 A | 4/1975 | Chilewich | |
| 3,920,211 A | * 11/1975 | Knight | 224/275 |
| 3,987,945 A | 10/1976 | McDowell | |
| 4,049,091 A | 9/1977 | Chubb | |
| 4,300,709 A | * 11/1981 | Page, Jr. | 224/275 |
| 4,512,503 A | 4/1985 | Gioso | |
| 4,678,154 A | 7/1987 | McFarland | |
| 4,787,541 A | 11/1988 | Pollard | |
| 4,795,210 A | 1/1989 | Milat | |
| 4,801,060 A | 1/1989 | Thompson | |
| 4,938,401 A | 7/1990 | Weisbrodt et al. | |
| 4,942,827 A | 7/1990 | Norgaard | |
| 5,149,032 A | 9/1992 | Jones et al. | |
| 5,611,287 A | 3/1997 | Begley | |
| 5,720,458 A | 2/1998 | Carpenter | |

* cited by examiner

Primary Examiner—Tri M. Mai
(74) Attorney, Agent, or Firm—Dennis G. LaPointe; Mason Law, P.A.

(57) ABSTRACT

A device for securely holding an object on a motor vehicle seat is generally comprised of a frame of four elongate members that form a parallelogram. Two of the elongate members have an extended portion that engages the crease between the back of the seat and the seat bottom portion. Flanges are formed on the ends of the elongate members opposite the ends that are secured in the crease of the seat, and flanges may also be formed at one end of each of the elongate members which are transverse to the elongate members that are secured in the crease. These flanges prevent the object being held from sliding forward or laterally toward the passenger door. The frame has a locking and collapsing mechanism to maintain its configuration while holding the object and for facilitating the collapse of the device for compact storage when not in use.

24 Claims, 8 Drawing Sheets

DEVICE FOR HOLDING A BRIEF CASE ON A VEHICLE SEAT

The invention relates to a device for holding a brief case, a computer laptop case, and similar objects securely on top of a car. The device holds the object in an approximately level position. The device is further described in more detail below and is generally comprised of a frame of four elongate members that form a parallelogram. Two of the elongate members have an extended portion that is arcuate shaped or generally V-shaped so as to engage the motor vehicle seat in the crease between the back of the seat and the seat bottom portion. Ears or flanges are formed on the ends of the elongate members opposite the ends that are secured in the crease of the seat, and ears or flanges may also be formed at one end of each of the elongate members which are transverse to the elongate members that are secured in the crease of the seat. These ears or flanges serve to prevent the object being held from sliding toward the front dashboard of the vehicle and off the seat as well as toward the passenger door of the vehicle. The frame has locking means to maintain its configuration while holding an object such as a briefcase. The locking means when unlocked facilitates the collapsing of the device for compact storage of the device when not in use.

In the accompanying drawings:

FIG. 3a is a plan view of the embodiment of FIG. 2a;

Referring now to the drawings, FIGS. 1–6 disclose a typical embodiment of the present invention, which is a device for holding an object such as a briefcase or computer laptop case securely on a motor vehicle seat 34, depicted generally as 10. The device comprises a first elongate member 12 and a second elongate member 14 in a spaced apart and generally parallel relationship, and a third elongate member 16 and a fourth elongate member 18 in a spaced apart and generally parallel relationship. The third and fourth elongate members 16,18 are configured or arranged transverse to the first and second elongate members 12,14 so as to form a parallelogram. The third elongate member 16 and the fourth elongate member 18 are each pivotally connected at 20 to the first and second elongate members 12,14 to complete the parallelogram.

Figure 1:
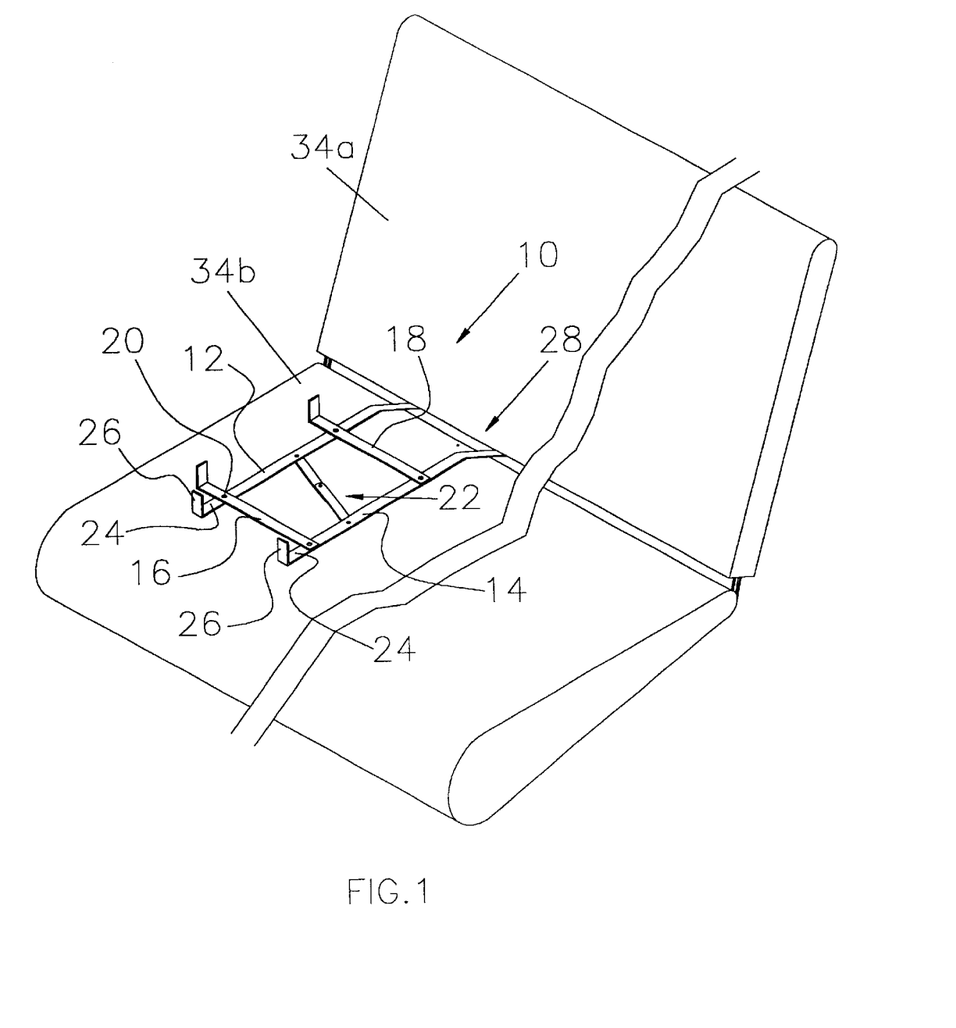
FIG. 1 is a perspective view of the invention on a motor vehicle seat.
Figure 2A:
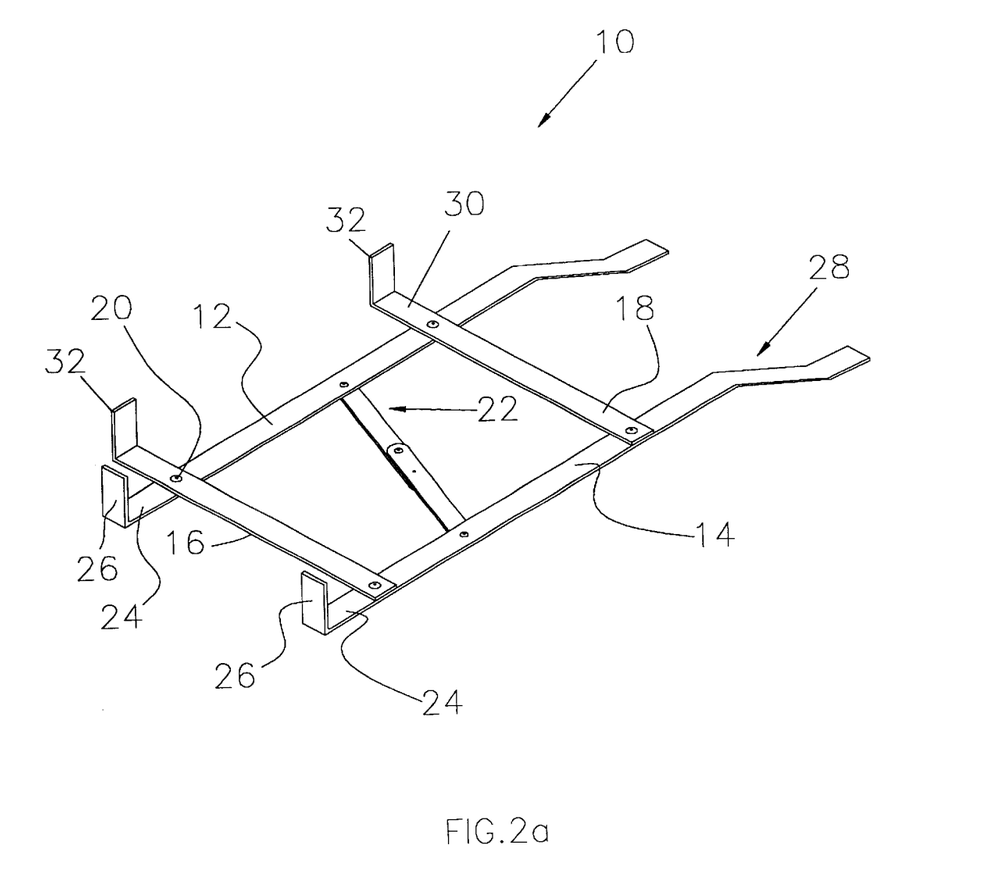
FIG. 2a is a perspective view of a typical embodiment of the invention.
Figure 2B:
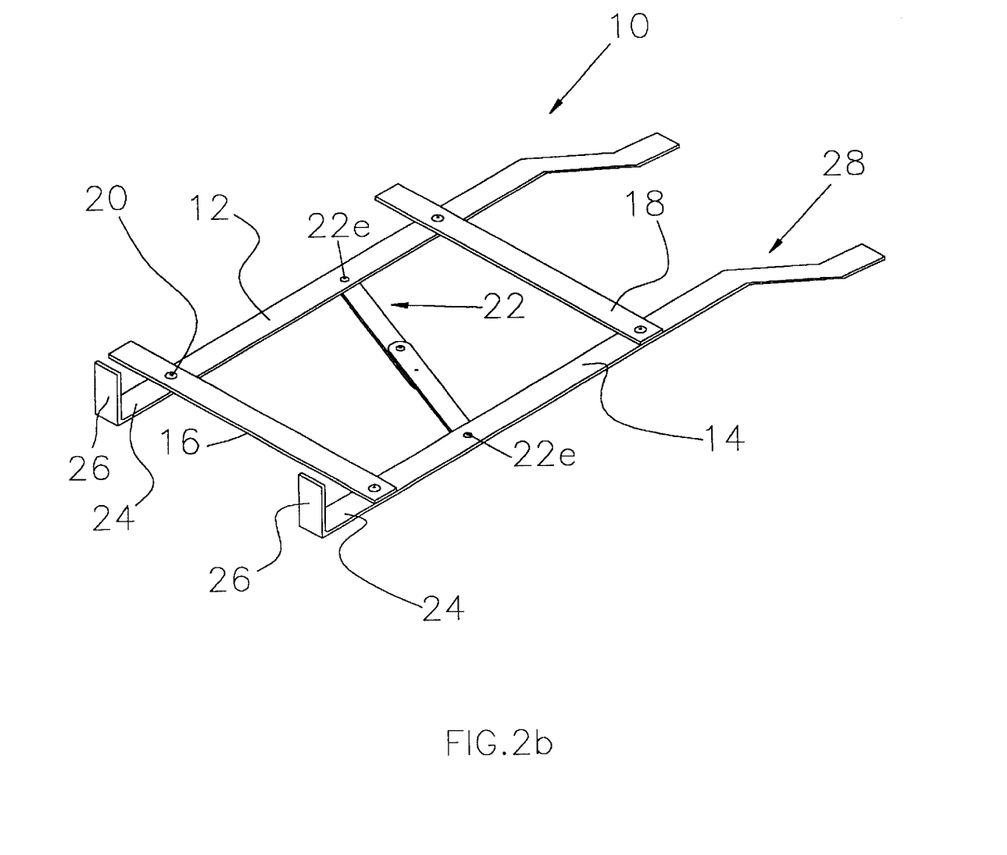
FIG. 2b is a perspective view of another typical embodiment of the invention.
Figure 3A:
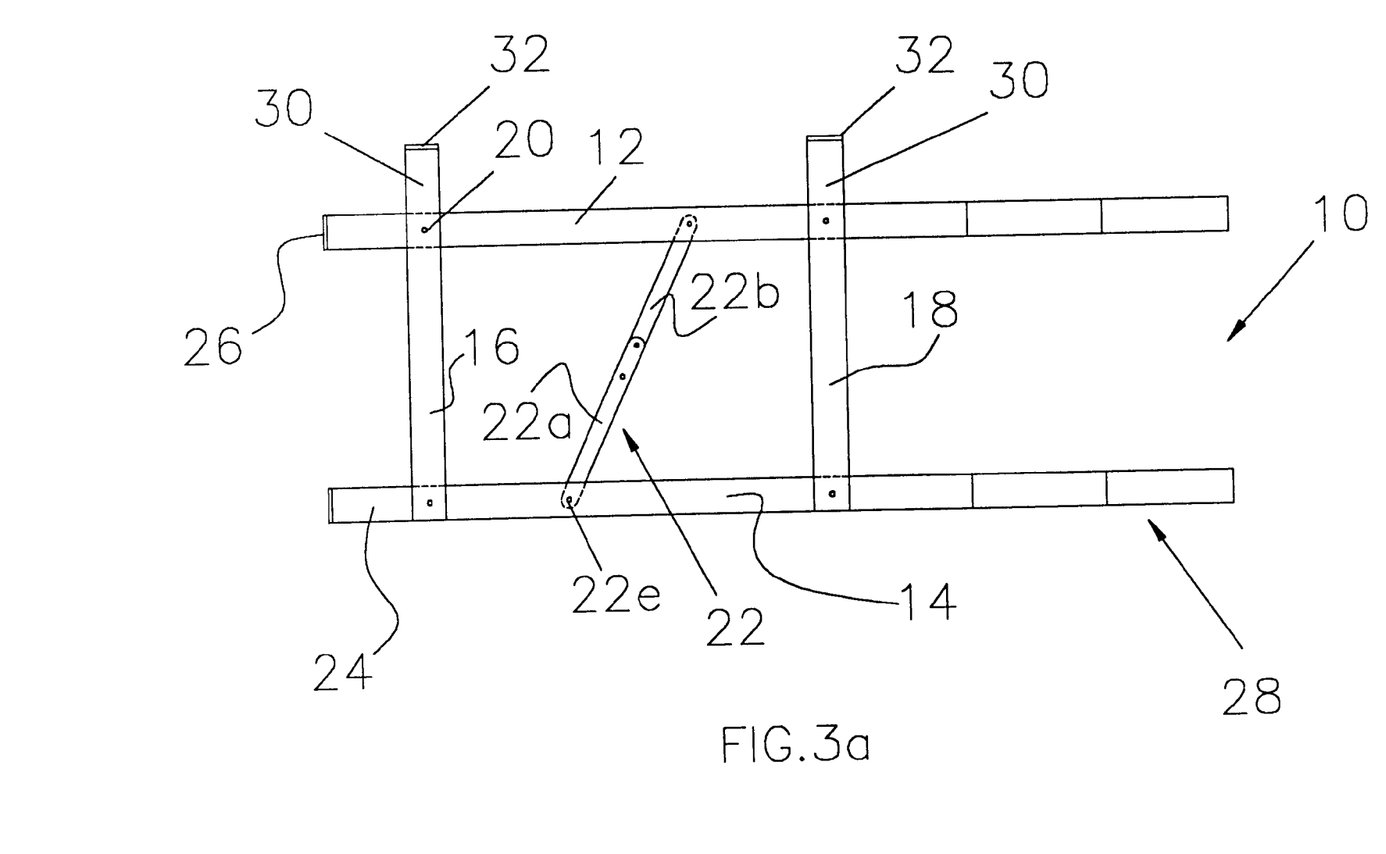

A fifth elongate member 22a is pivotally connected at one end 22e with the second elongate member 14 at an intermediate location between the third and fourth elongate members 16,18. A sixth elongate member 22b is pivotally connected at one end 22e with the first elongate member 12 at an intermediate location between the third and fourth elongate members 16,18.

Each of the pivotal connections can be made in a number of ways known in the art, including the use of rivet-like connections, bushings and washers, etc,. and the fittings used can be made from materials such as metallic, preferably aluminum if metallic, nylon, plastics and other polymeric materials.

Each of the first, second, third, fourth, fifth and sixth elongate members can also be made of various lightweight materials, preferably flat stock or flat bar as it is sometimes called in the trade. Materials can also include metallic, preferably aluminum if made from metallic materials, and various plastics and other polymeric materials.

Figure 5A:
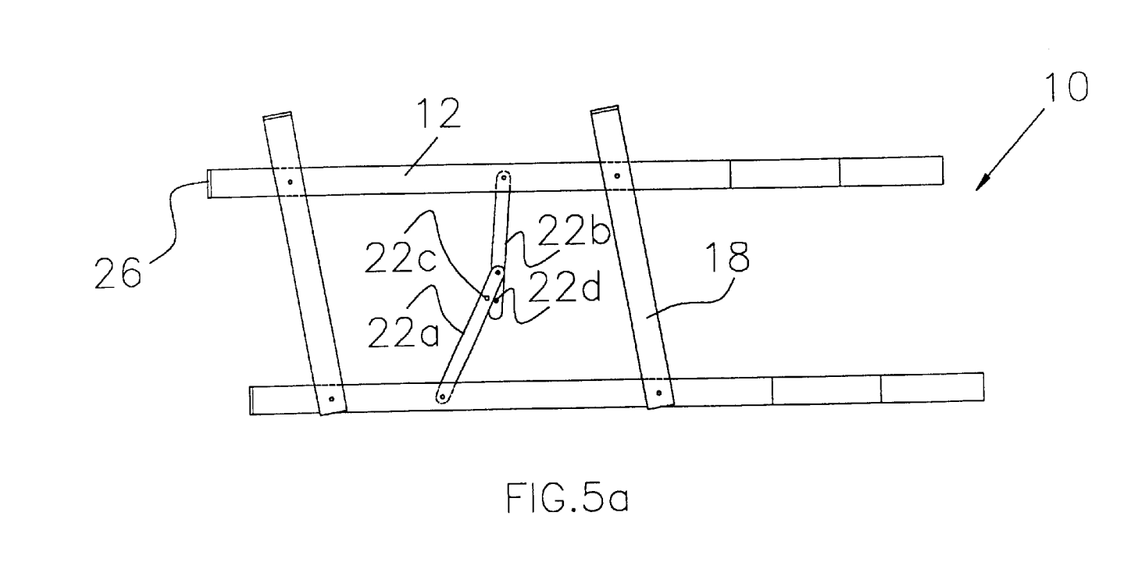
FIG. 5a is a plan view of the invention in a partially collapsed state.
Figure 5B:
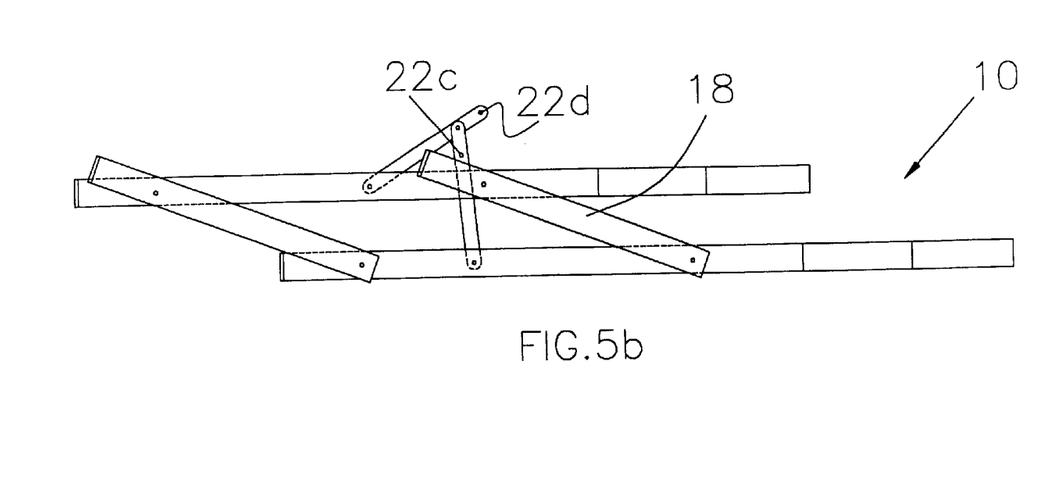
FIG. 5b is a plan view of the invention in a substantially collapsed state for easy storage when not in use.
Figure 6:
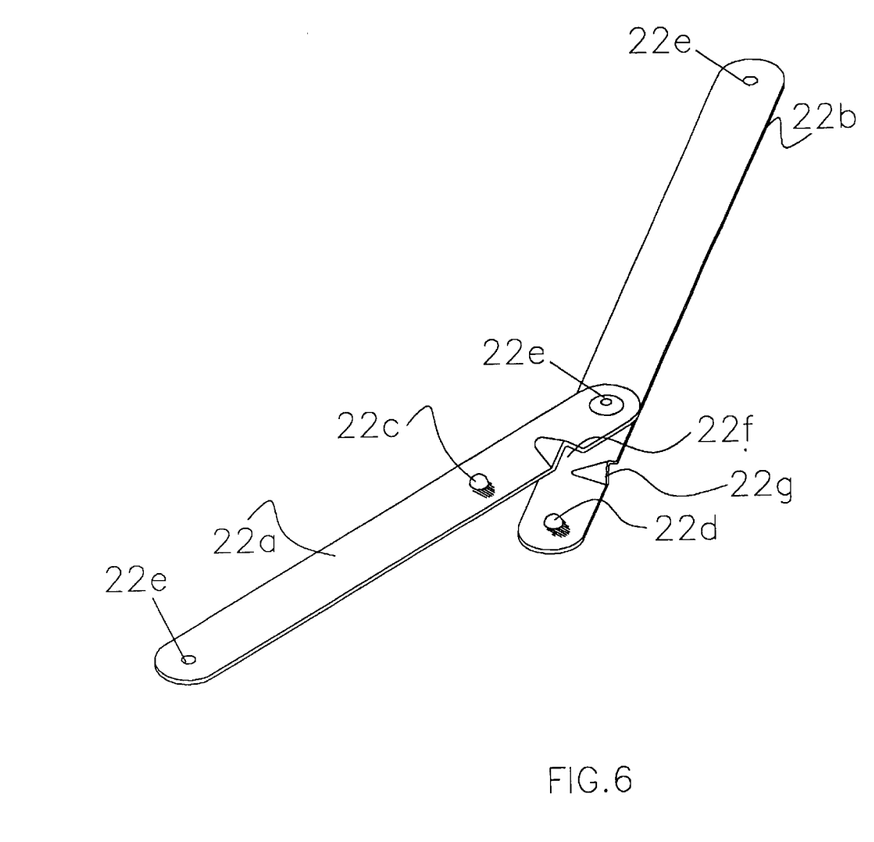
FIG. 6 is a perspective view of one typical application of the locking means.

The opposite end of each the fifth and sixth elongate members 22a,22b have cooperative engagement means 22 for selectively interlocking the fifth and sixth elongate members 22a,22b in a rigid straight configuration and collapsing said fifth and sixth elongate members 22a,22b, thereby collapsing the formed parallelogram for facilitating compact storage of the device 10 when not in use.

Means 22 can be provided in several different ways known in the art, for example but not limited to, a mechanism similar to that used to fold the legs on card tables or chairs is an easy to operate mechanism. The end of one of the elongate members, for example 22a, would be pivotally connected at 22e to the opposite elongate member, in this case 22b, at a preset distance from the end of elongate member 22b. At an intermediate location between the end of elongate member 22b and the pivotal connection 22e is an indent portion 22g that frictionally engages with a corresponding indent portion 22f on elongate member 22a. To further provide for interlocking the members 22a,22b in a straight rigid configuration, in the example started, a ridge or raised portion 22d near the end of elongate member 22b can be provided to frictionally engage a dimpled portion 22c on elongate member 22a. Of course, other methods can be used including a concentric arrangement wherein the elongate members 22a,22b can be aligned in a straight configuration and another concentric nipple or tube slides down over the overlap portions of the elongate members 22a,22b. To collapse the device 10, the nipple or tube would be moved along one of the elongate members 22a or 22b away from the overlap portions and the elongate members 22a,22b could either be separated or folded (if connected) to fold the device 10 for easy compact storage.

The fifth and sixth elongate members may typically be made from flat stock approximately ½ inch to about ¾ inches wide by generally about ⅟₁₆ inch to about ⅛ inch in thickness.

The first and second elongate members 12,14 each extend a predetermined distance from the third elongate member 16 and outside the formed parallelogram, the extended portion 24 ending with a raised flanged portion 26 for preventing a forward movement of the object being held by the device 10. The raised flanged portions 26 preferably extend upwardly from about ¾ inch to about 2 inches in height.

The first and second elongate members 12,14 also each extends a predetermined distance from the fourth elongate member 18 and outside the formed parallelogram ending with means 28 for securing the device 10 between a back 34a and a bottom 34b of a motor vehicle seat.

It is also preferred, but not necessary, that the third and fourth elongate members 16,18 each further include an extended portion 30 extending from the first elongate member and outside the formed parallelogram ending with a raised flanged portion 32 for preventing a lateral movement of the object being held by the device. As with the previously described raised flange portions 26 for the first and second elongate members 12,14, raised flanged members 32 should be approximately ¾ inch to 2 inches in height.

The means 28 on each of the first and second elongate members for securing the device between the back 34a and the bottom 34b of the motor vehicle seat may be formed in a number of ways. Typically to ensure a good secure engagement with the seat, the device 10 would typically be aligned angularly with the seat such that the ends of the elongate members 12,14 start sliding into the crease and then the device 10 is rotated downwardly so as to lay in a generally level orientation with the seat bottom section 34b while the ends of elongate members 12,14 snuggly engages the underside and partial back side of the back 34a of the seat. That is, the ends are designed with a bend such that when the back 34a of the seat is properly engaged, the device 10 simply will not slide out horizontally. The front end will have to be lifted as the device 10 is slid out to remove the device 10 from the seat.

Figure 3B:
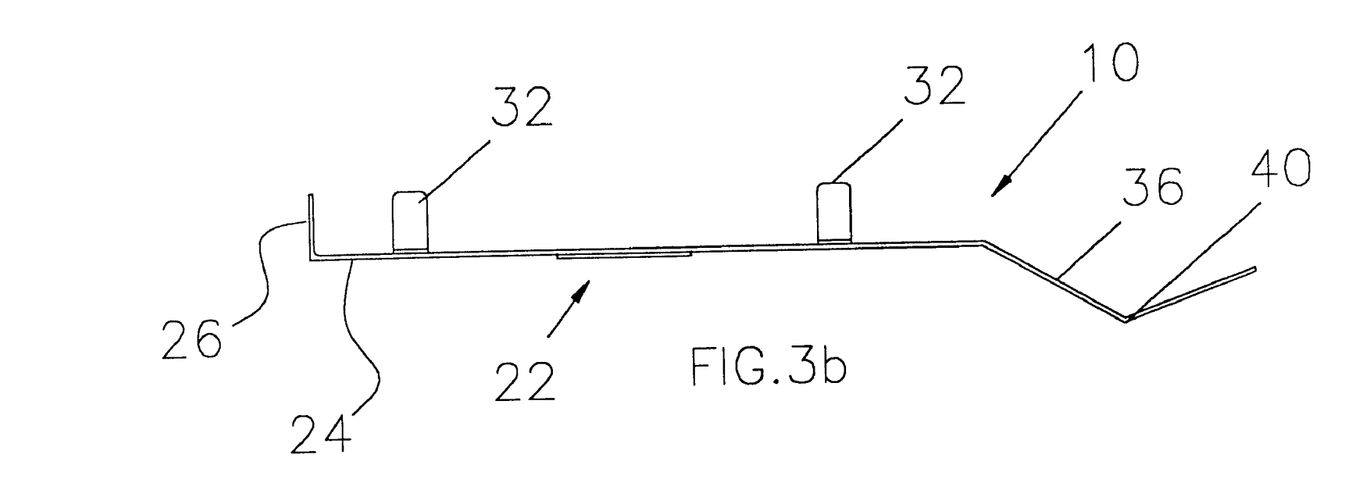
FIG. 3b is an elevation view of the invention as depicted in FIG. 3a with a V-shaped portion for engagement with the seat of a motor vehicle.
Figure 3C:
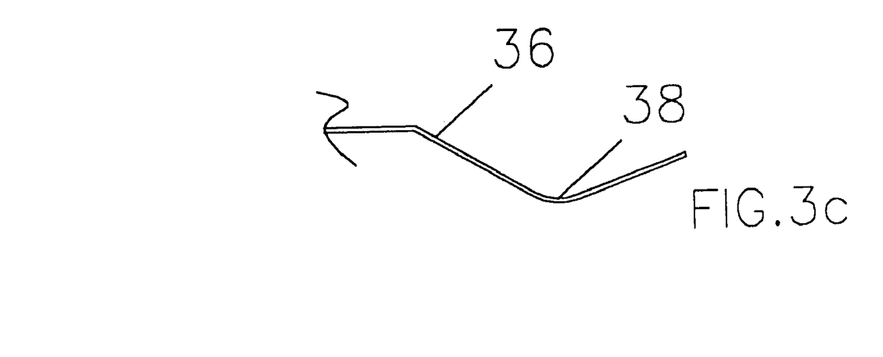
FIG. 3c is a partial view depicting an arcuate-shaped portion for engagement with the seat of a motor vehicle.

One typical bent shape is as shown in drawings, where means 28 comprises an angularly depending portion 36 ending with a generally upwardly directed arcuate-shaped portion 38. Another typical bent shape is where means 28 comprises an angularly depending portion 36 ending with a generally upwardly directed V-shaped portion 40.

Overall typical contemplated dimensions for a device 10 to properly hold brief cases may be about 9 inches by about 12 inches to form a generally rectangular parallelogram. In this configuration, a recommended continued level extension portion for the first and second elongate members 12,14 to extend beyond the boundaries of a formed parallelogram, is about 3 inches on either side of the third and fourth elongate members 16,18. The depending portions 36 preferably depend about for about 4½ inches to about 5½ inches at which point the bent portion, that is, the arcuate-shaped portion 38 or the V-shaped portion 40 is integrated with the device 10. A typical angle formed by the depending portion 36 and the upwardly directed portion of the arcuate-shaped portion 38 or V-shaped portion 40 is typically about 120° to about 140°. The upwardly directed portion of the arcuate-shaped portion 38 or V-shaped portion 40 typically would contribute about another 3 inches in total length to the device.

Figure 4:
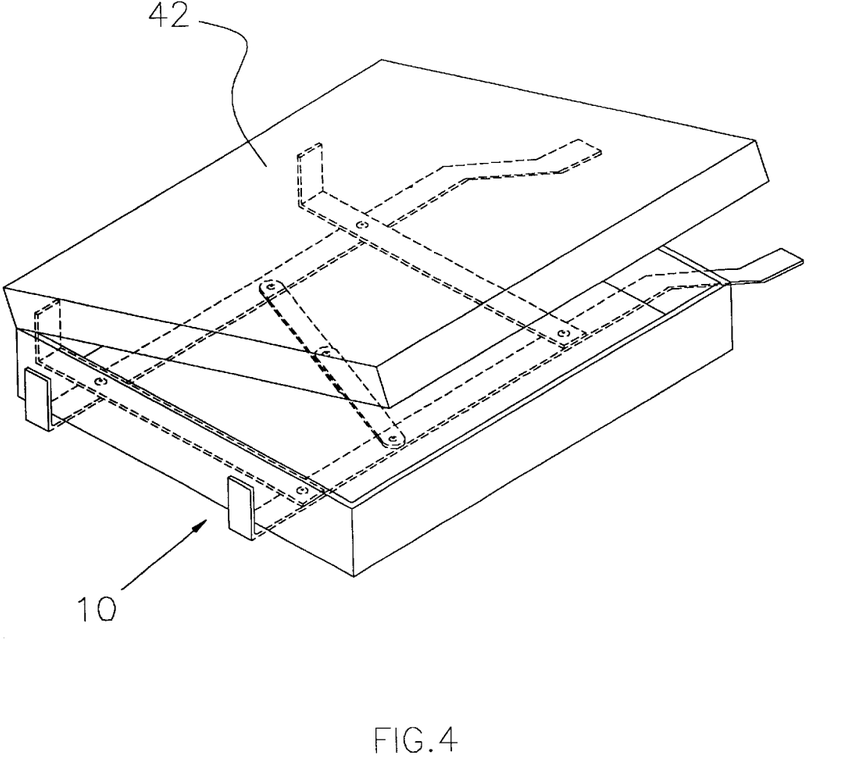
FIG. 4 is a perspective view of the invention with an object such as a brief case or laptop computer case being held in place.

These suggested dimensions would allow a driver to place a brief case 42 within the device 10, such that the brief case 42 would be oriented toward the driver. The dimensions could in general be shortened to accommodate laptop cases 42 oriented in the same way or for accommodating brief cases 42 or laptop cases 42 where the back of the cases are facing the back 34a of the seat.

It is also suggested, but not required, that the stock used to make the first, second, third and fourth elongate members 12,14,16,18 be made from 7/64 inch to 3/16 inch thick material and from ¾ inch to 1¼ inches wide material. Further, although the drawings depict a device 10 which would typically be used on the right side of a driver as is typical of vehicles used for driving in the United States and Canada, it is contemplated that a mirror image of the device 10 could be made for use on vehicles designed for driving in Europe where the driver sits on the right side of the vehicle and drives on the left side of the road.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

Now that the invention has been described,

What is claimed is:

1. A device for holding an object such as a briefcase or computer laptop case securely on a motor vehicle seat comprising:

a first elongate member and a second elongate member in a spaced apart and generally parallel relationship;

a third elongate member and a fourth elongate member in a spaced apart and generally parallel relationship;

the third and fourth elongate members being transverse to the first and second elongate members so as to form a parallelogram;

the third elongate member and the fourth elongate member each being pivotally connected to the first and second elongate members to form said parallelogram;

the first and second elongate members each extending a predetermined distance from the third elongate member and outside the formed parallelogram ending with a raised flanged portion for preventing a forward movement of the object being held by the device; and the first and second elongate members each extending a predetermined distance from the fourth elongate member and outside the formed parallelogram ending with means for securing the device between a back and a bottom of a motor vehicle seat.

2. The device according to claim 1, further comprising:

a fifth elongate member pivotally connected at one end with the second elongate member at an intermediate location between the third and fourth elongate members; and a sixth elongate member pivotally connected at one end with the first elongate member at an intermediate location between the third and fourth elongate members.

3. The device according to claim 2, wherein each opposite end of the fifth and sixth elongate members having cooperative engagement means for selectively interlocking the fifth and sixth elongate members in a rigid straight configuration and for collapsing said fifth and sixth elongate members, thereby collapsing the formed parallelogram for facilitating compact storage of the device when not in use.

4. The device according to claim 1, wherein the third and fourth elongate members each further comprise:

an extended portion extending from the first elongate member and outside the formed parallelogram ending with a raised flanged portion for preventing a lateral movement of the object being held by the device.

5. The device according to claim 1, wherein the means on each of the first and second elongate members for securing the device between the back and the bottom of the motor vehicle seat comprises an angularly depending portion ending with a generally upwardly directed arcuate-shaped portion.

6. The device according to claim 1, wherein the means on each of the first and second elongate members for securing the device between the back and the bottom of the motor vehicle seat comprises an angularly depending portion ending with a generally upwardly directed V-shaped portion.

7. A device for holding an object such as a briefcase or computer laptop case securely on a motor vehicle seat comprising:

a first elongate member and a second elongate member in a spaced apart and generally parallel relationship;

a third elongate member and a fourth elongate member in a spaced apart and generally parallel relationship;

the third and fourth elongate members being transverse to the first and second elongate members so as to form a parallelogram;

the third elongate member and the fourth elongate member each being pivotally connected to the first and second elongate members to form said parallelogram;

the first and second elongate members each extending a predetermined distance from the third elongate member and outside the formed parallelogram ending with a raised flanged portion for preventing a forward movement of the object being held by the device;

the first and second elongate members each extending a predetermined distance from the fourth elongate member and outside the formed parallelogram ending with means for securing the device between a back and a bottom of a motor vehicle seat;

a fifth elongate member pivotally connected at one end with the second elongate member at an intermediate location between the third and fourth elongate members; and a sixth elongate member pivotally connected at one end with the first elongate member at an intermediate location between the third and fourth elongate members.

8. The device according to claim 7, wherein each opposite end of the fifth and sixth elongate members having cooperative engagement means for selectively interlocking the fifth and sixth elongate members in a rigid straight configuration and for collapsing said fifth and sixth elongate members, thereby collapsing the formed parallelogram for facilitating compact storage of the device when not in use.

9. The device according to claim 7, wherein the third and fourth elongate members each further comprise:

an extended portion extending from the first elongate member and outside the formed parallelogram ending with a raised flanged portion for preventing a lateral movement of the object being held by the device.

10. The device according to claim 7, wherein the means on each of the first and second elongate members for securing the device between the back and the bottom of the motor vehicle seat comprises an angularly depending portion ending with a generally upwardly directed arcuate-shaped portion.

11. The device according to claim 7, The device according to claim 1, wherein the means on each of the first and second elongate members for securing the device between the back and the bottom of the motor vehicle seat comprises an angularly depending portion ending with a generally upwardly directed V-shaped portion.

12. A device for holding an object such as a briefcase or computer laptop case securely on a motor vehicle seat comprising:

a first elongate member and a second elongate member in a spaced apart and generally parallel relationship;

a third elongate member and a fourth elongate member in a spaced apart and generally parallel relationship;

the third and fourth elongate members being transverse to the first and second elongate members so as to form a parallelogram;

the third elongate member and the fourth elongate member each being pivotally connected to the first and second elongate members to form said parallelogram;

the first and second elongate members each extending a predetermined distance from the third elongate member and outside the formed parallelogram ending with a raised flanged portion for preventing a forward movement of the object being held by the device;

the first and second elongate members each extending a predetermined distance from the fourth elongate member and outside the formed parallelogram ending with means for securing the device between a back and a bottom of a motor vehicle seat;

a fifth elongate member pivotally connected at one end with the second elongate member at an intermediate location between the third and fourth elongate members;

a sixth elongate member pivotally connected at one end with the first elongate member at an intermediate location between the third and fourth elongate members; and each opposite end of the fifth and sixth elongate members having cooperative engagement means for selectively interlocking the fifth and sixth elongate members in a rigid straight configuration and for collapsing said fifth and sixth elongate members, thereby collapsing the formed parallelogram for facilitating compact storage of the device when not in use.

13. The device according to claim 12, wherein the third and fourth elongate members each further comprise:

an extended portion extending from the first elongate member and outside the formed parallelogram ending with a raised flanged portion for preventing a lateral movement of the object being held by the device.

14. The device according to claim 12, wherein the means on each of the first and second elongate members for securing the device between the back and the bottom of the motor vehicle seat comprises an angularly depending portion ending with a generally upwardly directed arcuate-shaped portion.

15. The device according to claim 12, wherein the means on each of the first and second elongate members for securing the device between the back and the bottom of the motor vehicle seat comprises an angularly depending portion ending with a generally upwardly directed V-shaped portion.

16. A device for holding an object such as a briefcase or computer laptop case securely on a motor vehicle seat comprising:

a first elongate member and a second elongate member in a spaced apart and generally parallel relationship;

a third elongate member and a fourth elongate member in a spaced apart and generally parallel relationship;

the third and fourth elongate members being transverse to the first and second elongate members so as to form a parallelogram;

the third elongate member and the fourth elongate member each being pivotally connected to the first and second elongate members to form said parallelogram;

the first and second elongate members each extending a predetermined distance from the third elongate member and outside the formed parallelogram ending with a raised flanged portion for preventing a forward movement of the object being held by the device;

the first and second elongate members each extending a predetermined distance from the fourth elongate member and outside the formed parallelogram ending with means for securing the device between a back and a bottom of a motor vehicle seat; and the third and fourth elongate members each further comprising an extended portion extending from the first elongate member and outside the formed parallelogram ending with a raised flanged portion for preventing a lateral movement of the object being held by the device.

17. The device according to claim 13, further comprising:

a fifth elongate member pivotally connected at one end with the second elongate member at an intermediate location between the third and fourth elongate members; and a sixth elongate member pivotally connected at one end with the first elongate member at an intermediate location between the third and fourth elongate members.

18. The device according to claim 17, wherein each opposite end of the fifth and sixth elongate members having cooperative engagement means for selectively interlocking the fifth and sixth elongate members in a rigid straight configuration and for collapsing said fifth and sixth elongate members, thereby collapsing the formed parallelogram for facilitating compact storage of the device when not in use.

19. The device according to claim 16, wherein the means on each of the first and second elongate members for securing the device between the back and the bottom of the motor vehicle seat comprises an angularly depending portion ending with a generally upwardly directed arcuate-shaped portion.

20. The device according to claim 16, wherein the means on each of the first and second elongate members for securing the device between the back and the bottom of the motor vehicle seat comprises an angularly depending portion ending with a generally upwardly directed V-shaped portion.

21. A device for holding an object such as a briefcase or computer laptop case securely on a motor vehicle seat comprising:

a first elongate member and a second elongate member in a spaced apart and generally parallel relationship;

a third elongate member and a fourth elongate member in a spaced apart and generally parallel relationship;

the third and fourth elongate members being transverse to the first and second elongate members so as to form a parallelogram;

the third elongate member and the fourth elongate member each being pivotally connected to the first and second elongate members to form said parallelogram;

the first and second elongate members each extending a predetermined distance from the third elongate member and outside the formed parallelogram ending with a raised flanged portion for preventing a forward movement of the object being held by the device;

the first and second elongate members each extending a predetermined distance from the fourth elongate member and outside the formed parallelogram ending with means for securing the device between a back and a bottom of a motor vehicle seat;

a fifth elongate member pivotally connected at one end with the second elongate member at an intermediate location between the third and fourth elongate members; and a sixth elongate member pivotally connected at one end with the first elongate member at an intermediate location between the third and fourth elongate members; and the third and fourth elongate members each further comprising an extended portion extending from the first elongate member and outside the formed parallelogram ending with a raised flanged portion for preventing a lateral movement of the object being held by the device.

22. The device according to claim 21, wherein each opposite end of the fifth and sixth elongate members having cooperative engagement means for selectively interlocking the fifth and sixth elongate members in a rigid straight configuration and for collapsing said fifth and sixth elongate members, thereby collapsing the formed parallelogram for facilitating compact storage of the device when not in use.

23. The device according to claim 21, wherein the means on each of the first and second elongate members for securing the device between the back and the bottom of the motor vehicle seat comprises an angularly depending portion ending with a generally upwardly directed arcuate-shaped portion.

24. The device according to claim 21, wherein the means on each of the first and second elongate members for securing the device between the back and the bottom of the motor vehicle seat comprises an angularly depending portion ending with a generally upwardly directed V-shaped portion.

* * * * *